April 10, 1956   H. E. BRELSFORD   2,741,125
LIQUID LEVEL GAUGE
Filed Aug. 1, 1952
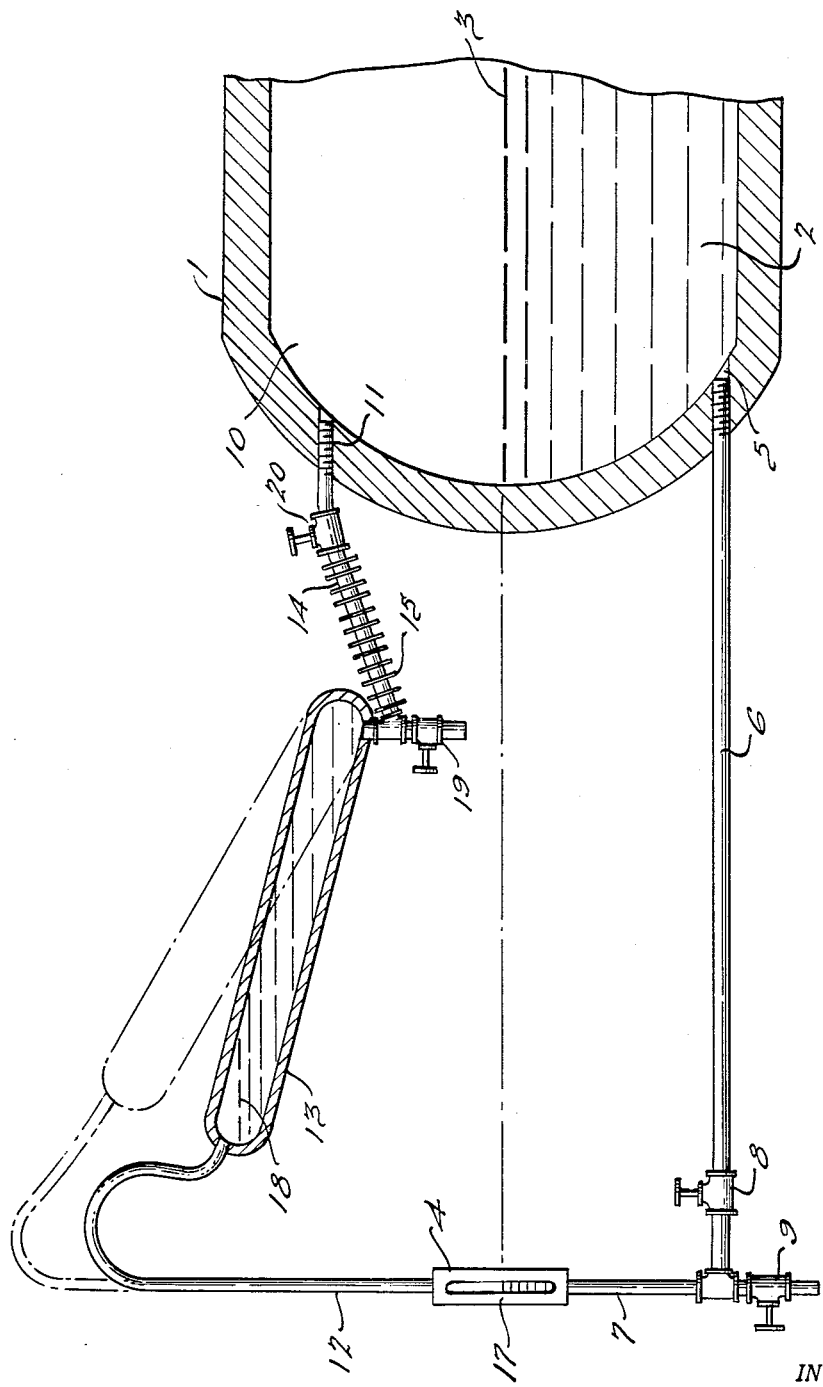
INVENTOR.
Harry E. Brelsford.
BY
Harness, Dickey & Pierce
ATTORNEYS.

Patented Apr. 10, 1956

2,741,125

LIQUID LEVEL GAUGE

Harry E. Brelsford, Lancaster, Ohio, assignor to Diamond Power Specialty Corporation, Lancaster, Ohio, a corporation of Ohio Application August 1, 1952, Serial No. 302,039

3 Claims. (Cl. 73—323)

This invention relates to direct view liquid level gauges for heated liquids, and particularly to an improved gauging system adapted to operate at substantially ambient temperatures.

An object of the invention is to provide an improved gauging system of the direct view type wherein relatively cold or room temperature liquid is accurately maintained at the same level as highly heated liquid in a boiler drum or the like.

Conventional liquid level gauges suitable for use on high pressure boilers require glass that will withstand high temperatures with wide variations and the attendant high stresses due to both pressure and temperature changes. Such glass, which is composed of materials having a strengthening effect when heat treated, will often age and lose its heat treatment, thereby creating a hazard to the boiler, the gauge, and the operating personnel.

Changes in temperature also affect the metal frame holding the glass, thereby causing variations in clamping pressure on the gaskets and glass with resulting leakage and breakage of glass.

The high temperatures have a tendency to dehydrate the asbestos fibers in gasket material and also dehydrate the sheet mica utilized to protect the glass against solution with the water. The failure of mica protectors results in rapid destruction of the glass by the solvent properties of the high temperature water.

According to the present invention, improvements are obtained in boiler liquid level gauge arrangements by providing a liquid level gauge system that operates at a relatively constant and low temperature. With this arrangement, it is possible to eliminate the high temperature stresses, the aging of the glass, and the dehydration of gasket material. Mica protectors are also eliminated since cold water, even at high pressures, does not have appreciable solvent properties for glass.

The foregoing and other features of this invention will be more clearly understood when read in conjunction with the accompanying drawing which shows, diagrammatically, a gauging system incorporating my invention, as applied to a water drum of a high pressure water-tube boiler.

Assuming that the gauge is to operate substantially at room temperature while the liquid in the boiler is at saturated temperature, it will be evident that due to simple physical principles, the level of hot (expanded) liquid in the boiler can be balanced by a shorter column of the colder (and denser) liquid at the gauge. Thus, the liquid level in the gauge would be lower than the liquid level in the boiler if no compensating means were employed.

In my improved system, a liquid level gauge of any convenient direct-view type may be employed, except that mica glass protectors need not be provided. Such a gauge is shown diagrammatically at 4 and is connected to the water space of drum 1 at 5 through pipes 6 and 7 which incorporate a shut-off valve 8 and a blow down valve 9. The top of gauge 4 is connected to the steam space 10 of drum 1 at 11 by a system which comprises tubing 12, an elongated inclined chamber 13, and finned pipe 14. Such upper connecting system is also provided with a shut-off valve 20 and a drain valve 19 at the low point. Tubing 12 has a small bore (e. g., $\frac{1}{10}$ inch).

The volume and positioning of chamber 13 and the proportioning of the other parts of the upper connecting system are such that air or inert gas which was contained at atmospheric pressure will compress at operating pressure so that when the gauge 4 is filled to the proper indicative height of liquid, the air or gas will occupy only a small volume at the upper end of chamber 13, in addition to occupying tube 12 and the upper part of the gauge. Pipe 14 may be of any convenient diameter and has radiating fins 15 integral thereto to cause rapid condensation of vapor inside, thereby forming liquid which will flow into the lower end of chamber 13 by gravity feed. Fins 15 also serve to maintain the liquid in the chamber 13 and pipe 14 at a relatively low temperature with respect to the operating temperature of the drum.

As will be explained hereinafter in detail, a relatively cool floating load is thus maintained in the upper connecting system. This floating load is biased against the pressure in the drum and opposes full communication of the pressure through the upper connecting system to the gauge chamber.

It will be noted that the inclined chamber 13 together with the pipe 14 forms a U tube. The liquid level 18 in the chamber 13 will be above the connection 11 of the drum 1, and the pressure at the top of the chamber will be less than the pressure at 11, inasmuch as the weight of the column of liquid in chamber 13 is balanced by the drum pressure plus the weight of the shorter column of liquid in the pipe 14. The pressure transmitted to the liquid level in the gauge will accordingly depend upon the pressure of the air or gas in chamber 13 above the liquid level and in tube 12. Adjustment of this pressure differential can be made by changing the volume of trapped gas in chamber 13.

The pressure in the top of the gauge 4 is decreased in an amount sufficient to cause the pressure in the drum 1 to force the liquid level 17 in the gauge 4 to rise to the level 3 of the liquid in the drum 1 when equilibrium is established. The decrease in pressure is accomplished by adjusting the inclination of the chamber 13 to enlarge the volume of gas trapped therein, thereby decreasing the air pressure in the chamber, the tube 12 and the top of the gauge 4 as will be appreciated. Adjustment of the inclination of the chamber 13 to decrease the volume of gas trapped therein would, of course, increase the pressure of the gas and lower the level of the liquid in the gauge.

A brief description will now be given of the manner in which the invention operates assuming that the boiler is cold and is being placed in service. Valve 8 is closed and valves 9, 19, and 20 are opened, thereby allowing any residual liquid in gauge 4, chamber 13, pipe 14, pipe 6, and tubing 12 to drain out of the system and allowing air to occupy the space inside these members. Valves 9 and 19 are then closed and valve 8 is opened. Liquid from drum 1 will then flow through pipe 6, valve 8, and pipe 7 into gauge 4, the liquid in the gauge 4 showing the same level as the liquid in the drum 1.

As heat is applied to the drum, the temperature and pressure of the liquid in the drum will rise and vapor will condense in pipe 14 because of the cooling effect of fins 15, filling chamber 13 and pipe 14 equally with liquid. Since the liquid in the gauge remains at substantially room temperature while that in the boiler rises, the liquid level 17 in the gauge will lower until equilibrium is established at the operating temperature.

The inclination of the chamber 13 is then adjusted to increase the volume of trapped air in the chamber by an amount sufficient to lower the pressure and raise the liquid level in the gauge to compensate for the temperature differential so that the level of the gauge will show the correct level of the liquid in the drum at the operating pressure.

If the operating conditions are later altered, the inclination of the chamber 13 may be readily adjusted to the new operating conditions. Instead of air in the trapped area, an inert gas may be used, preferably a gas which does not dissolve appreciably in water.

It is to be understood that the above-described arrangement is illustrative of the application of the principles of the invention. Numerous other arrangements may be devised by those skilled in the art without departing from the spirit and scope of the invention.

What is claimed is:

1. A level gauging system for a vessel adapted to contain a heated liquid, said system adapted to operate at substantially ambient temperature and remotely indicating the level of liquid in said vessel, said system comprising a remotely disposed indicating instrument of the columnar type having a gauge chamber therein wherein liquid is maintained at a level corresponding to the level in the vessel and having upper and lower connecting portions communicating with said gauge chamber, means for connecting the lower connecting portion to said vessel below the liquid level in the latter, upper connecting means operatively interconnecting the upper connecting portion and the vessel above the liquid level in the vessel, means for compensating for differences in the temperature of the liquid in the vessel and the temperature of the liquid in the gauge chamber, incorporated in said upper connecting means, including a compensating chamber portion, a liquid partially filling said compensating chamber leaving a gas space above said last-mentioned liquid, and means for connecting said compensating chamber below the liquid level therein to said vessel above the liquid level therein, said compensating chamber and said last-mentioned connecting means being in the general form of a U, said liquid in said compensating chamber portion being biased against the pressure in said vessel and opposing full communication of such pressure, through the upper connecting means, to the gauge chamber.

2. A level gauging system for a vessel adapted to contain a heated liquid, said system adapted to operate at substantially ambient temperature and remotely indicating the level of liquid in said vessel, said system comprising a remotely disposed indicating instrument of the columnar type having a gauge chamber therein wherein liquid is maintained at a level corresponding to the level in the vessel and having upper and lower connecting portions communicating with said gauge chamber, means for connecting the lower connecting portion to said vessel below the liquid level in the latter, upper connecting means operatively interconnecting the upper connecting portion and the vessel above the liquid level in the vessel, means for compensating for differences in the temperature of the liquid in the vessel and the temperature of the liquid in the gauge chamber, incorporated in said upper connecting means, including a compensating chamber portion, a liquid partially filling said compensating chamber leaving a gas space above said last-mentioned liquid, a tube smaller in diameter than said compensating chamber interconnecting the top of said gauge chamber and said compensating chamber above the liquid level of the compensating chamber, connecting means in the general form of a U connecting said compensating chamber below the liquid level therein to said vessel above the liquid level therein, air or gas in said compensating chamber and in said tube, said liquid in said compensating chamber portion being biased against the pressure in said vessel by said air or gas and opposing full communication of such pressure, through the upper connecting means to the gauge chamber, and means for vertically moving said compensating chamber.

3. A level gauging system for a vessel adapted to contain a heated liquid, said system adapted to operate at substantially ambient temperature and remotely indicating the level of liquid in said vessel, said system comprising a remotely disposed indicating instrument of the columnar type having a gauge chamber therein wherein liquid is maintained at a level corresponding to the level in the vessel and having upper and lower connecting portions communicating with said gauge chamber, means for connecting the lower connecting portion to said vessel below the liquid level in the latter, upper connecting means operatively interconnecting the upper connecting portion and the vessel above the liquid level in the vessel, means for compensating for differences in the temperature of the liquid in the vessel and the temperature of the liquid in the gauge chamber, incorporated in said upper connecting means, including a compensating chamber portion, a liquid partially filling said compensating chamber leaving a gas space above said last-mentioned liquid, a tube smaller in diameter than said compensating chamber interconnecting the top of said gauge chamber and said compensating chamber above the liquid level of the compensating chamber, connecting means in the general form of a U connecting said compensating chamber below the liquid level therein to said vessel above the liquid level therein, said U-shaped connecting means having heat dissipating means appurtenant to the leg adjacent the vessel, air or gas in said compensating chamber and in said tube, said liquid in said compensating chamber portion being biased against the pressure in said vessel by said air or gas and opposing full communication of such pressure, through the upper connecting means to the gauge chamber, and means for vertically moving said compensating chamber.

References Cited in the file of this patent

UNITED STATES PATENTS

| | | |
|---|---|---|
| 1,869,400 | Underwood | Aug. 2, 1932 |
| 2,068,135 | Howse | Jan. 19, 1937 |
| 2,158,785 | Hall | May 16, 1939 |
| 2,337,171 | Winton | Dec. 21, 1943 |